(12) United States Patent
Keppeler et al.

(10) Patent No.: US 11,131,006 B2
(45) Date of Patent: Sep. 28, 2021

(54) TREATMENT DEVICE AND METHOD FOR REMOVING COATINGS

(71) Applicant: WIELAND-WERKE AG, Ulm (DE)

(72) Inventors: Frank Michael Keppeler, Neu-Ulm (DE); Andreas Reindl, Senden (DE); Frank Sälzle, Illerkirchberg (DE)

(73) Assignee: WIELAND-WERKE AG, Ulm (DE)

( * ) Notice: Subject to any disclaimer, the term of this patent is extended or adjusted under 35 U.S.C. 154(b) by 3 days.

(21) Appl. No.: 16/637,812

(22) PCT Filed: Aug. 14, 2018

(86) PCT No.: PCT/EP2018/000400
§ 371 (c)(1),
(2) Date: Feb. 10, 2020

(87) PCT Pub. No.: WO2019/052680
PCT Pub. Date: Mar. 21, 2019

(65) Prior Publication Data
US 2020/0172992 A1 Jun. 4, 2020

(30) Foreign Application Priority Data

Sep. 12, 2017 (DE) ...................... 10 2017 008 530.7

(51) Int. Cl.
*C22B 1/00* (2006.01)
*B65G 49/04* (2006.01)

(52) U.S. Cl.
CPC .......... *C22B 1/005* (2013.01); *B65G 49/0409* (2013.01); *B65G 49/0427* (2013.01)

(58) Field of Classification Search
CPC ............ B65G 49/0427; B65G 49/0413; B65G 49/02; B65G 49/025; B65G 49/04; B65G 49/0409
See application file for complete search history.

(56) References Cited

U.S. PATENT DOCUMENTS 2,179,868 A * 11/1939 Fredstebler ............ A23N 12/02
134/68
2,630,202 A * 3/1953 Saxe ...................... B65G 47/80
198/580

(Continued)

FOREIGN PATENT DOCUMENTS

DE    9309007.2 U1    10/1993
DE    102004028496 B3    11/2005

(Continued)

OTHER PUBLICATIONS

International Search Report issued in corresponding International Application No. PCT/EP2018/000400 with English translation dated Oct. 12, 2018 (5 pages).

(Continued)

*Primary Examiner* — William R Harp
(74) *Attorney, Agent, or Firm* — Flynn Thiel, P.C.

(57) ABSTRACT

The invention relates to a treatment device and a method for removing coatings, comprising a vibratory conveyor with a conveying channel, which is designed in the manner of a trough, in order to form a treatment bath with a liquid decoating medium, comprising an inlet end and an outlet end for bulk material, wherein the conveying direction of the conveying channel runs from the inlet end to the outlet end. The conveying channel has below the surface of the treatment bath at least one feeding device and at least one discharging device for the decoating medium.

9 Claims, 2 Drawing Sheets

(56) References Cited

U.S. PATENT DOCUMENTS

| | | | | |
|---|---|---|---|---|
| 2,894,516 A | * | 7/1959 | Froehlich | B65G 51/01 |
| | | | | 134/62 |
| 3,610,260 A | * | 10/1971 | Kearney | B08B 3/041 |
| | | | | 134/12 |
| 4,022,638 A | | 5/1977 | Weet | |
| 9,487,844 B2 | * | 11/2016 | Pillkahn | C22B 7/006 |

FOREIGN PATENT DOCUMENTS

| | | |
|---|---|---|
| DE | 102011011532 B3 | 8/2012 |
| DE | 102017008530 A1 | 3/2019 |
| EP | 0211239 A1 | 2/1987 |
| EP | 0569749 A1 | 11/1993 |
| WO | 2012110239 A1 | 8/2012 |

OTHER PUBLICATIONS

Written Opinion of International Searching Authority issued in corresponding International Application No. PCT/EP2018/000400 dated Oct. 12, 2018 (5 pages).

Office Action of German Patent Office issued in corresponding German Application No. 10 2017 008 530.7 dated Apr. 16, 2018 (8 pages).

* cited by examiner

TREATMENT DEVICE AND METHOD FOR REMOVING COATINGS

TECHNICAL FIELD

The invention relates to a vibratory conveyor apparatus, and to a method for removing coatings.

BACKGROUND

Pure copper and/or copper alloys are/is provided on a large scale with a coating, with the result that considerable quantities accrue within the context of reprocessing or as recycling material. In the case of metallic raw materials, the reusable material cycle has been well established for a long time. For instance, in the case of stamping and bending of components, for example of plug-in connectors, from strips of copper materials, approximately from 50 to 60% of the strip which is used typically accrue as stamping scrap. If said stamping scrap materials are present as a single type, they are melted down again and reprocessed to form new strips. In the case of coated strips, for example copper strips, which are coated with tin, silver or further elements and alloys thereof, the stamping scrap materials usually cannot be reprocessed to form new strips, since the coating material must not be found in the alloy composition of the base material. Scrap materials which are "contaminated" in this way usually have to be smelted. Smelting costs occur, and a considerable metal value loss occurs as a result of the loss of the alloy and coating elements. The same problem also occurs in the case of the reprocessing of partially coated or partially plated strips. Partial coatings can consist, for example, of tin, gold or silver. Partial platings can consist, for example, of roll-bonded strips of aluminum. In contrast to full-surface coatings or platings, the stamping scrap has, in the case of partial coatings or partial platings, first and second regions which differ with regard to their reusability.

Document WO 2012/110239 A1 has disclosed a method for removing coatings from scrap materials. To this end, the scrap is brought into contact with a liquid and, during the removal of the coating, is moved in a conveyor channel of a vibratory conveyor along a conveying direction from the inlet end to the outlet end of the conveyor channel. The method has particular importance in the case of the dezincification of steel scrap materials. During the carrying out of a dezincification of this type, it is therefore of importance to monitor the reaction times precisely, in order that the undesired dissolution of iron remains within a reasonable limit.

A vibratory conveyor is described having a conveyor channel, in which the removal of the coating is carried out. Vibratory conveyors of this type are mechanical conveyor units for bulk materials of different types, in the case of which the medium to be transported is moved by means of vibrations. A typical vibratory conveyor moves obliquely upward in the conveying direction and back for transporting purposes, as a result of which the movement as a rule comprises a vertical component and a horizontal component in the conveying direction. In this way, the material to be conveyed is moved upward and, after the vibratory conveyor itself has moved back, comes into contact again in a region which lies closer to the outlet end of the conveyor channel in the conveying direction. The material to be conveyed which is moved onto the conveyor channel at the inlet end is therefore moved step by step in the direction of the outlet end, by being thrown continuously somewhat upward and in the direction of the outlet end by way of the vibrations. Per vibration, the material to be conveyed is moved further approximately by the horizontal vector of the vibration amplitude. Modern conveyor channels allow the precise type of vibration to be set, with the result that the frequency, the pulse, the angle, etc. can be set. The conveyor channel of a vibratory channel is usually composed of a largely flat floor and lateral borders which run in the longitudinal direction. During operation, the material to be conveyed is moved onto or into the conveyor channel at one end, the inlet end, and is moved further in the conveying direction to the other end, the outlet end.

The invention is based on the object of developing an apparatus for removing coatings.

The invention is accordingly directed to an apparatus and to a method for removing coatings.

The invention comprises a treatment apparatus for removing coatings, having a vibratory conveyor with a conveyor channel which is of trough-like configuration, in order to configure a treatment bath with a liquid decoating medium, having an inlet end and having an outlet end for bulk material, the conveying direction of the conveyor channel running from the inlet end to the outlet end. The conveyor channel has at least one feeding device and, below the surface of the treatment bath, at least one discharging device for the decoating medium.

The decoating medium can be introduced via the feeding device above and/or below the surface of the treatment bath, and can thus generate a flow of the decoating medium.

A uniflow, counterflow or crossflow relative to the conveying direction of the bulk material which is transported in the conveyor channel is produced by way of inlet and outlet openings below and/or above the bath level of the decoating medium in the channel of the vibratory conveyor. Here, an additional flow of the decoating medium on the surface of the bulk material is produced in addition to the wobbling motion of the vibratory conveyor. The strength of the flow can vary in terms of direction and component, and can further aid a rapid layer removal. An additional incident flow of the bulk material surface additionally reduces the thickness of the reaction layers on the bulk material surface and contributes to an efficient layer removal. The decoating medium can be, for example, an acidic aqueous solution, in particular with the constituent of sulfuric acid. The use of alkaline solutions is also envisaged.

If the feeding device and the discharging device are arranged below the surface of the treatment bath, a flow reversal can be achieved in a simple way if required. What is known as pulsed operation is also possible by way of a flow reversal with a rapid interval sequence. Pulsed operation generates a continuously changing flow on the surface of the bulk material in order to further assist the layer removal.

Flat and lumpy scrap materials which have a coating are particularly preferably used as bulk material. Here, for example, these can be stamping scrap materials consisting of tin-coated copper alloy material, which stamping scrap materials should be available as far as possible as a single type for further recycling and therefore have to be pretreated.

By way of a flow of the decoating medium, advantageous concentration gradients can also be set, and dissolved substances can be discharged from the treatment bath for reprocessing. Moreover, the transporting away of the removed coating constituents can take place in a defined direction and at a predefinable speed, as a result of which an effective and efficient layer removal of the coated bulk material which is used is ensured independently of the filling quantity and the throughput quantity of the material in the vibratory conveyor channel.

By way of a flow, the contact time for removing the coating can therefore also be reduced. In addition, satisfactory wetting of the surface of the bulk material with the decoating medium from all sides is ensured.

One particular advantage of the solution according to the invention results from a significant improvement of the layer removal by way of satisfactory and possibly all-round wetting of the bulk material surface below a closed bath level in a moving decoating medium.

In one preferred refinement of the invention, the at least one feeding device can be arranged at the inlet end for bulk material. The at least one discharging device can be arranged at the outlet end for bulk material, or else at a point between the inlet end and the outlet end. As a result, a homogeneous flow in the movement direction of the bulk material is generated, which homogeneous flow promotes the transporting of the bulk material.

The at least one discharging device can advantageously be arranged at the inlet end for bulk material. The at least one feeding device can be arranged at the outlet end for bulk material or else at a point between the inlet end and the outlet end. As a result, a flow which is opposed to the movement direction of the bulk material is generated, which flow promotes the flow on the surface of said bulk material for efficient layer removal.

The at least one feeding device and the at least one discharging device can advantageously be arranged transversely with respect to the conveying direction so as to lie opposite one another and between the inlet end and the outlet end for bulk material. As a result, the transporting operations in the transport direction are influenced to a lesser extent and nevertheless generate an additional positive flow characteristic on the surface of the bulk material for layer removal.

In a further preferred refinement of the invention, the bottom of the conveyor channel can run horizontally. In the case of a horizontal bottom, an automatic conveyor device which removes the treated bulk material from the plant preferably reaches at the outlet end into the trough-like bath which is enclosed on all sides by way of side walls.

The bottom of the conveyor channel can advantageously run in an inclined manner at least in sections in the conveying direction. In this way, the decoating medium collects either at the inlet end or at the outlet end, as a result of which the dimensioning of the treatment bath allows further advantageous technical refinements.

In one preferred embodiment of the invention, the bottom of the conveyor channel can run so as to rise or fall in the conveying direction from the inlet end to the outlet end. In the case of a rising course of the conveyor channel, the outlet end of the bottom of the conveyor channel is preferably raised above the bath level. There is therefore no side wall at the outlet end, with the result that, during operation of the plant, the bulk material can fall via the outlet end directly into a collecting container or onto other transport means.

In a further advantageous embodiment of the invention, the bottom of the conveyor channel can run so as to rise or fall with an inclination of from 3° to 10° in the conveying direction from the inlet end to the outlet end. The precise selection of the angle of inclination is determined from the fact that there is no longer a side wall at the outlet end, and the treatment bath is configured here primarily at the inlet end or at the outlet end. The inclination is selected in any case to be so great that the treatment bath is sufficiently deep at least over a defined transport path, in order to wet the bulk material on all sides.

In one particularly preferred embodiment, the bottom of the conveyor channel can have elevations at least in sections. The elevations are intended to bring about a certain roughness or surface structure, with the result that, during operation of the plant, the liquid decoating medium can also wet the bottom-side surface of the bulk material in an improved manner. Elevations of this type can be produced, for example, using forming technology by way of pressing or else solely by way of sandblasting.

In a further advantageous refinement of the invention, the bottom of the conveyor channel can be configured in a double-walled manner and as a flow duct for the decoating medium with passage openings into the treatment bath. As a consequence, the flow duct runs below the bulk material to be transported. During operation of the plant, the decoating medium passes by means of the passage openings directly from below into the treatment bath, and first of all flows around the bottom side of the bulk material, which bottom side can usually be reached with relative difficulty. As a result, the bulk material to be treated is then flowed around on all sides. As a result of the entry of liquid from the bottom side, the bulk material which bears against the bottom is also raised from the bottom of the conveyor channel and adhesion is avoided as a consequence. The part of the wall with passage openings can be configured as a perforated plate. The hole sequence and the hole diameter are determined according to the fact that it is not possible for any bulk material to fall downward through the perforation. Here, the double-walled part of the conveyor channel can also be in multiple pieces, with the result that, for example, perforated plates of different perforation and possibly also of different surface structure can be exchanged and can therefore be adapted to the geometry of the bulk material to be treated.

The bottom of the conveyor channel can advantageously have grooves or channels. Grooves or channels of this type preferably run in the conveying direction and serve for the distribution of the decoating medium in the treatment bath as it were below the bulk material. As a result, a bottom-side guiding structure for the decoating medium is produced.

In one advantageous embodiment of the invention, the feeding device or the discharging device can be arranged on the vibratory conveyor at the lowest point of the treatment bath. As a result, a bottom drain is configured, by means of which the treatment bath can be drained without residue if required for maintaining and cleaning the plant.

In one preferred embodiment of the invention, the treatment bath can be of liquid-tight and/or gas-tight configuration. The vibratory conveyor is preferably configured with a cover which can be opened or removed and which seals the vibratory conveyor apart from the inlet points at the inlet end and the outlet points at the outlet end. Lock devices can be arranged at the inlet points and outlet points, by way of which lock devices the process space can be closed in a liquid-tight or gas-tight manner in borderline cases. As a result, an undesired outlet of the decoating medium can be prevented effectively.

Furthermore, a cleaning device can preferably be arranged in the region of the conveyor channel. Nozzle systems can be arranged for cleaning purposes in the interior space of the vibratory conveyor, which nozzle systems clean the process space with flushing medium, for example, after a removal of the decoating medium. Here, the cleaning medium can likewise be removed through a bottom-side drain in the conveyor channel into a further exchangeable collecting container.

A further aspect of the invention comprises a method for removing coatings by means of a treatment apparatus according to the invention by way of the following steps which follow one another:

the bulk material is introduced via the inlet end of the conveyor channel into a treatment bath with decoating medium, the bulk material is conveyed in the conveyor channel along the conveying direction to the outlet end, the treated bulk material is removed at the outlet end.

Here, said aspect of the invention likewise proceeds from the consideration that a significant improvement of the layer removal is produced by way of wetting of the bulk material surface below a closed bath level in a moving decoating medium, which wetting is satisfactory and as far as possible on all sides.

BRIEF DESCRIPTION OF THE DRAWINGS

Further exemplary embodiments of the invention will be described in greater detail on the basis of the figures, in which.

DETAILED DESCRIPTION

Parts which correspond to one another are provided with the same designations in all the figures.

Figure 1:
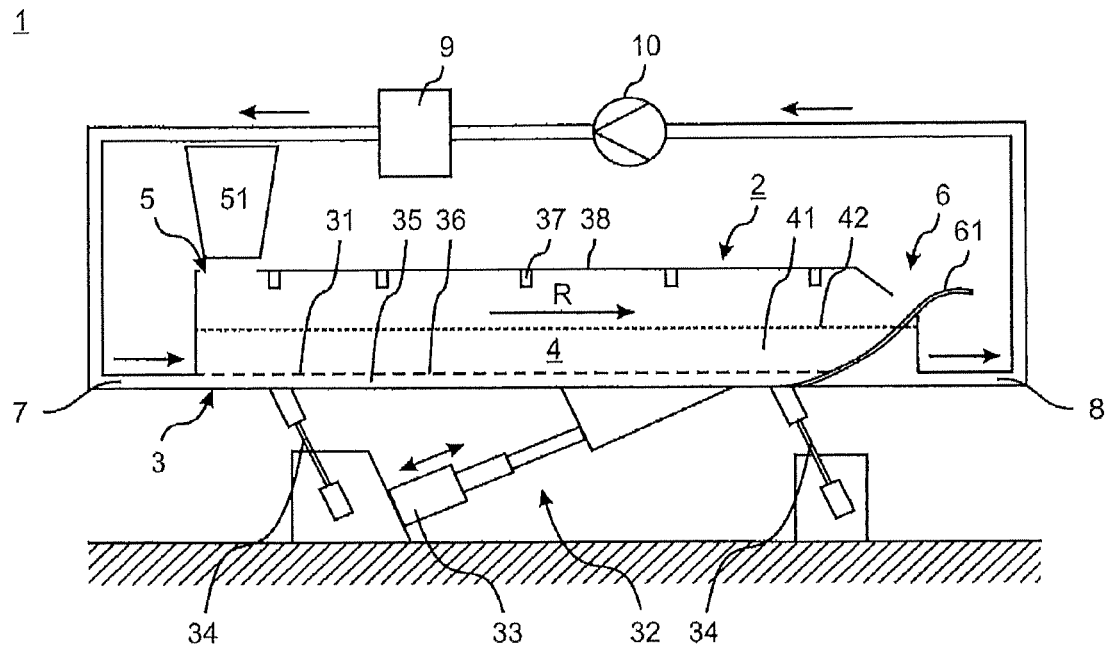
FIG. 1 shows a diagrammatic illustration of a treatment apparatus.

FIG. 1 shows a treatment apparatus 1 for removing coatings, having a vibratory conveyor 2 with a conveyor channel 3 which is of trough-like configuration, in order to configure a treatment bath 4 with a liquid decoating medium 41. Coated bulk material 20 of the plant is fed from a storage container 51 and is discharged via a conveyor device 61 via the inlet end 5 and the outlet end 6, respectively. The conveying direction R of the conveying channel 3 runs from the inlet end 5 toward the outlet end 6. The conveyor channel 3 has at least one feeding device 7 and at least one discharging device 8 for the decoating medium 41 below the surface 42 of the treatment bath 4.

Dissolved substances are discharged for reprocessing from the treatment bath 4 by way of a flow of the decoating medium 41. Via the discharging device 8, a certain proportion of the decoating medium 41 is conveyed via a pumping device 10 into a reprocessing device 9. In the reprocessing device 9, the dissolved coating material can be deposited again, for example, by way of chemical processes. In the further course, the reprocessed decoating medium 41 is fed via the feeding device 7 to the treatment bath 4 for removing coatings.

The feeding device 7 and the discharging device 8 are preferably attached by way of an elastic hose or a tube with an elastic connector to the conveyor channel 3, which is intended to prevent a transmission of the vibrations during operation of the plant.

The bottom 31 of the conveyor channel 3 is configured in a double-walled manner and as a flow duct 35 for the decoating medium 41 with passage openings 36 into the treatment bath 4. As a consequence, the flow duct 35 runs below the bulk material to be transported. Via passage openings 36, the decoating medium 41 passes from below into the treatment bath 4 which is situated above, as a result of which the bottom side of the bulk material is first of all also flowed around, which bottom side can usually be reached with relative difficulty. The part of the wall having passage openings 36 is configured as a perforated plate.

The conveyor channel 3 of the vibratory conveyor 2 is set vibrating by way of a vibratory device 32 during operation of the plant as a mechanical conveying unit for bulk materials. The vibratory drive 33 moves the conveyor channel 3 obliquely upward in the conveying direction R and back for transporting purposes, as a result of which the movement comprises a vertical component and a horizontal component in the conveying direction R. The material to be conveyed which is introduced into the conveyor channel 3 at the inlet end 5 is moved step by step in the direction of the outlet end 6 by way of the vibratory operation. The elastic suspension 34 makes the vibratory movement of the conveyor channel 3 relative to the underlying surface possible. The vibration is set with regard to the frequency, the pulse and the angle. Furthermore, the treatment apparatus 1 has a cleaning device 37 which is installed in a cover element 38 in the upper part of the plant.

Figure 2:
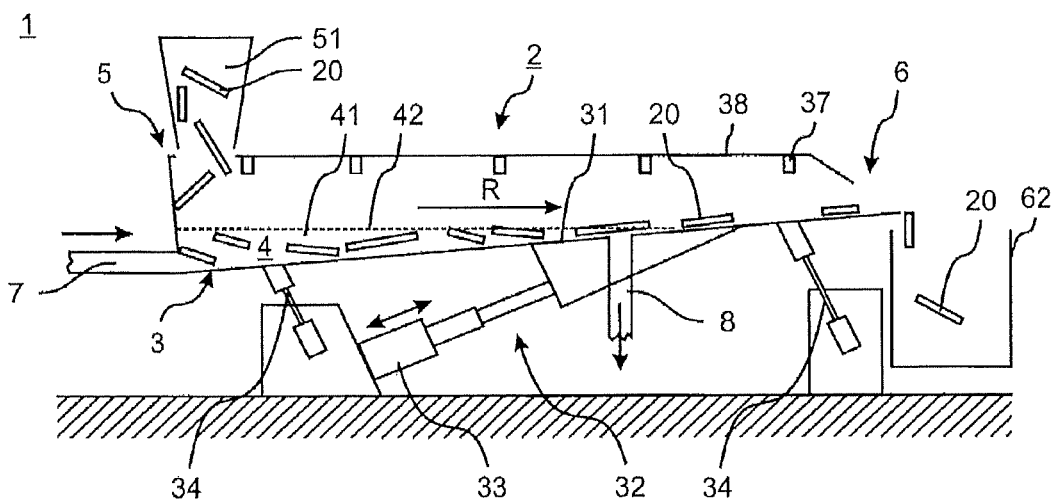
FIG. 2 shows a diagrammatic illustration of a further embodiment of a treatment apparatus having a conveyor channel which is inclined in a rising manner.

FIG. 2 shows a diagrammatic illustration of a further embodiment of a treatment apparatus 1 having an inclined conveyor channel 3. The bottom 31 of the conveyor channel 3 runs in a rising manner in the conveying direction R from the inlet end 5 to the outlet end 6. As a result, the decoating medium 41 collects in the treatment bath 4 at the inlet end 5, and the outlet end 6 of the bottom 31 of the conveyor channel 3 is raised above the bath level 42. Therefore, during operation of the plant, the bulk material 20 can be introduced from the storage container 51 into the conveyor channel 3 at the outlet end 6, and can fall into a collecting container 62 via the open outlet end 6. In this case, the feeding device 7 is arranged at the inlet end 5 for bulk material 20. The discharging device 8 is arranged at a point between the inlet end 5 and the outlet end 6. For the sake of clarity, FIG. 2 does not show the reprocessing device and the pumping device in further detail.

Figure 3:
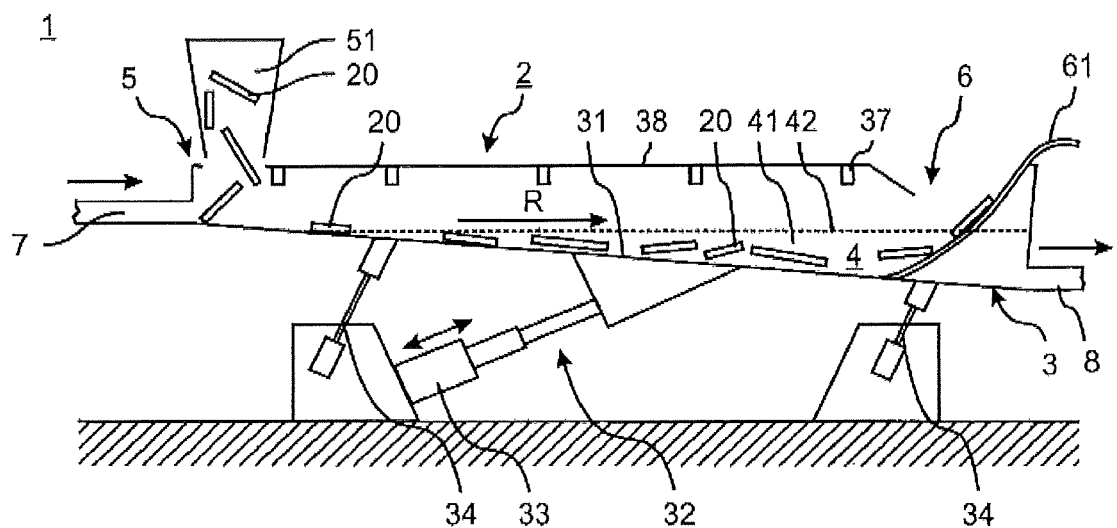
FIG. 3 shows a diagrammatic illustration of a further embodiment of a treatment apparatus having a conveyor channel which is inclined in a falling manner.

FIG. 3 shows a diagrammatic illustration of a further embodiment of a treatment apparatus 1 having an inclined conveyor channel 3. The bottom 31 of the conveyor channel 3 runs in a falling manner in the conveying direction R from the inlet end 5 to the outlet end 6. As a result, the decoating medium 41 collects in the treatment bath 4 at the outlet end 6, and the inlet end 5 of the bottom 31 of the conveyor channel 3 is raised above the bath level 42.

Coated bulk material 20 of the plant is fed from a storage container 51 and is discharged via a conveying device 61 via the inlet end 5 and the outlet end 6, respectively. The conveyor channel 3 has a feeding device 7 above the surface 42 of the treatment bath 4, and has a discharging device 8 for the decoating medium 41 below the surface 42 of the treatment bath 4. In this case, the discharging device 8 is arranged at the outlet end 6 for bulk material 20. For the sake of clarity, the reprocessing device and the pumping device are once again not shown in further detail in FIG. 3.

The invention claimed is:

1. A treatment apparatus for removing coatings, having a vibratory conveyor with a conveyor channel which is of trough-like configuration in order to contain a treatment bath including a liquid decoating medium, the conveyor channel having an inlet end and an outlet end for bulk material, a conveying direction of the conveyor channel running from the inlet end to the outlet end, wherein the conveyor channel has at least one feeding area at the inlet end for bulk material, and, below a surface of the treatment bath, at least one discharging area for the liquid decoating medium.

2. The treatment apparatus as claimed in claim 1, wherein the bottom of the conveyor channel runs horizontally.

3. The treatment apparatus as claimed in claim 1, wherein a bottom of the conveyor channel runs in an inclined manner in the conveying direction.

4. The treatment apparatus as claimed in claim 3, wherein the bottom of the conveyor channel runs so as to rise or fall in the conveying direction from the inlet end to the outlet end.

5. The treatment apparatus as claimed in claim 4, wherein the bottom of the conveyor channel runs so as to rise or fall with an inclination of from 3° to 10° in the conveying direction from the inlet end to the outlet end.

6. The treatment apparatus as claimed in claim 1, wherein the feeding area is disposed at a lowest point of the treatment bath.

7. The treatment apparatus as claimed in claim 1, wherein the treatment bath is of liquid-tight and/or gas-tight configuration.

8. The treatment apparatus as claimed in claim 1, wherein a cleaning device is arranged in a region of the conveyor channel.

9. A method for removing coatings with a treatment apparatus as claimed in claim 1, including the following steps which follow one another:

the bulk material is introduced via the inlet end of the conveyor channel into the treatment bath with liquid decoating medium, the bulk material is conveyed in the conveyor channel along the conveying direction to the outlet end, and treated bulk material is removed at the outlet end.

* * * * *

UNITED STATES PATENT AND TRADEMARK OFFICE
CERTIFICATE OF CORRECTION

PATENT NO. : 11,131,006 B2  
APPLICATION NO. : 16/637812  
DATED : September 28, 2021  
INVENTOR(S) : Frank Michael Keppeler et al.

It is certified that error appears in the above-identified patent and that said Letters Patent is hereby corrected as shown below:

In the Claims

Claim 2, Column 7, Line 7; change "the bottom of the conveyor" to --- a bottom of the conveyor ---

Signed and Sealed this  
Thirtieth Day of November, 2021

Drew Hirshfeld  
*Performing the Functions and Duties of the*  
*Under Secretary of Commerce for Intellectual Property and*  
*Director of the United States Patent and Trademark Office*